Figure 1:
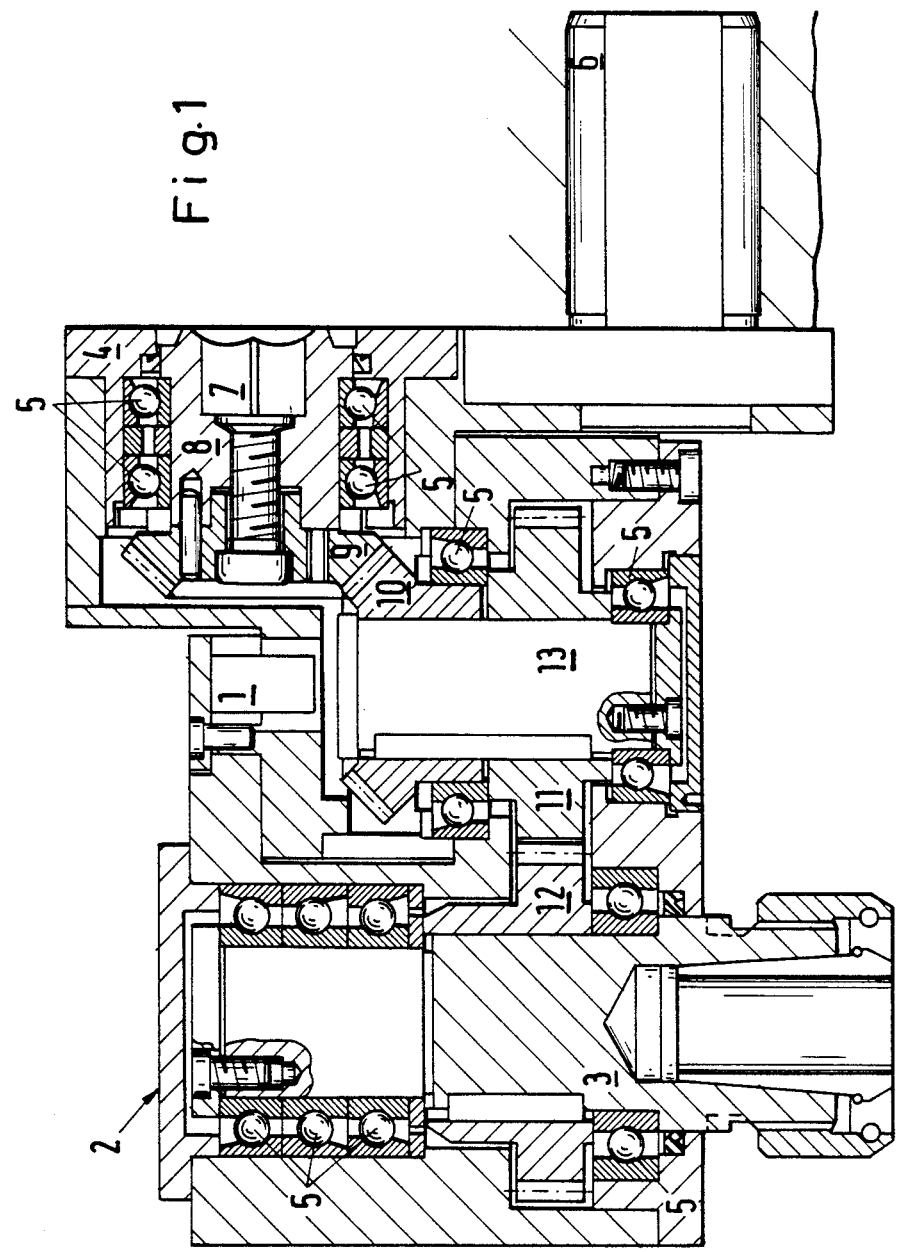

United States Patent [19]

Horsky et al.

[11] Patent Number: 4,836,725
[45] Date of Patent: Jun. 6, 1989

[54] ADJUSTABLE TOOL-HOLDER IN MACHINE-TOOLS FOR SLOT MILLING

[75] Inventors: Anton Horsky, Wangen; Siegfried Kuhn, Dürnau; Wolf-Dietrich Voss, Boll, all of Fed. Rep. of Germany

[73] Assignee: Boehringer Werkzeugmaschinen GmbH, Offenburg, Fed. Rep. of Germany

[21] Appl. No.: 138,453
[22] PCT Filed: Feb. 24, 1987
[86] PCT No.: PCT/EP87/00102
  § 371 Date: Dec. 21, 1987
  § 102(e) Date: Dec. 21, 1987
[87] PCT Pub. No.: WO87/04959
  PCT Pub. Date: Aug. 27, 1987

[30] Foreign Application Priority Data

Feb. 24, 1986 [DE] Fed. Rep. of Germany ....... 3605913

[51] Int. Cl.[4] .......................... B23C 7/02; B23C 1/12; B23C 3/28
[52] U.S. Cl. ...................................... 409/201; 279/6; 409/211; 409/214
[58] Field of Search .................... 279/6; 409/144, 200, 409/201, 211, 204, 214, 216, 218; 408/236

[56] References Cited

U.S. PATENT DOCUMENTS 1,365,536  1/1921  Nielsen .................. 51/240
1,628,975  5/1927  Hawkins ................ 409/144
2,219,717 10/1940  Swahnberg ............ 173/152
2,915,949 12/1959  Novkov ................. 409/200

FOREIGN PATENT DOCUMENTS 239253   7/1910  Fed. Rep. of Germany .
660745   7/1929  France .
2481169 10/1981  France .
944557  12/1963  United Kingdom .

Primary Examiner—Steven C. Bishop

[57] ABSTRACT

Lathes usually have only two axes of movement for the tool, namely the directions of the displacement of the saddle and cross rest. Since power-driven tools are increasingly being used, especially in NC lathes, in which radial and axial slotting is performed on the workpiece with end mills, for example, there is a need, for example, to vary the width of the slot by slightly shifting the tool in a third direction perpendicular to the first two directions of movement. Precisely in the case of slotting, no continuous adjustment is necessary, as it would be very costly to achieve mechanically. Instead it is sufficient to be able to reach two or three fixedly specified, changeable positions. This can be achieved by an arcuate movement of the tool which will also contain components of the desired third direction of movement, and this can be achieved mechanically either by rotating a part of the tool head or by an eccentrically configured tool socket.

8 Claims, 4 Drawing Sheets

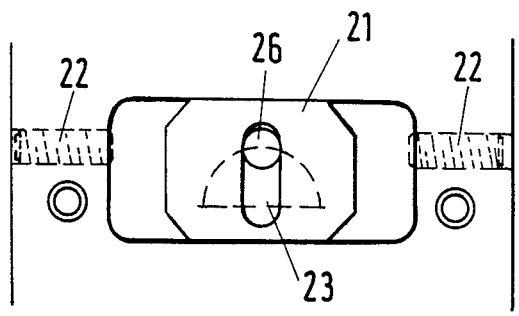
Fig. 3
Fig. 4
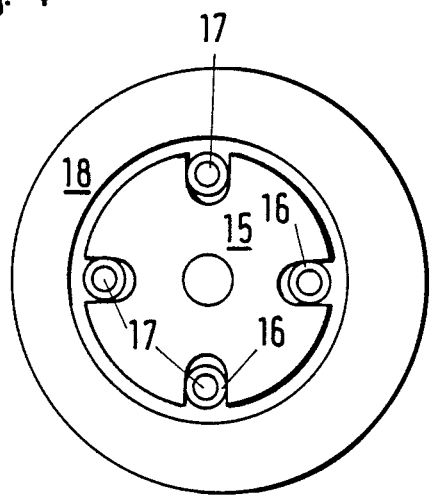

ADJUSTABLE TOOL-HOLDER IN MACHINE-TOOLS FOR SLOT MILLING

The invention relates to a power-driven milling unit for machine tools, which is movable in a first and a second direction perpendicular to one another, and which are the directions of movement of the longitudinal and cross rests of the machine tool.

Power-driven milling tools or milling tool heads of this kind are today commonly put into the tool holding means of general purpose machine tools, and especially into the tool turrets of numerically controlled lathes in order to be able to perform boring and milling work on a stationary or revolving workpiece, such as, say, oil feed bores or axial or radial keyways. Such lathes usually have only one saddle and one cross slide, that is, a first and a second direction of movement for the tool.

In order to mill an axial slot, for example, with such a system, in a stationary workpiece mounted in the lathe, there have been three different possibilities:

The first possibility is that the axial slot is made on the side of the workpiece, i.e., at the level of the longitudinal axis of the workpiece, by a radially extended end mill. The depth of the slot in this case is adjusted by means of the cross rest, while the length of the groove is produced by running the tool along the saddle. The width of the groove, however, is determined exclusively by the diameter of the end mill, with the resultant disadvantage that a tolerance specified for the slot width can be satisfied, after the end mill is worn, only by replacing the tool with a fresh one. There is no way of resizing the worn end mill. Accordingly, a great number of end mills must be prepared in the case of series production, and tool changing must be performed frequently, and in this case the normal edge life of the end mills, depending on the slot width tolerances, cannot be fully utilized. This involves relatively high manufacturing costs due to the great amount of time spent in tool changing and the incomplete utilization of the theoretically possible tool edge life.

The second possibility is that each of the two side flanks of the axially running slot is produced by one of two end mills which are mounted on different tool holders. Since only one flank is machined by each end mill, the desired precision of the groove width can be achieved in the event of wear by readjusting the two end mills, and is not dependent on the diameter of the individual end mills. The one end mill, therefore, is set just over and the other just under the level of the longitudinal axis of the workpiece. The disadvantage of this is that two separate, power-driven tool heads are required for the two mills, so that it requires two tool chucks instead of the one required in the first solution of the problem.

The third solution is that one end mill is used, as in the first solution, but this has a diameter that is less than the width of the slot that is to be made. The two flanks of the groove, therefore, are made by the same end mill in two different steps. The adjustment of the level of the end mill that is necessary for this purpose in the described arrangement of the workpiece requires, therefore, an adjustment of the end mill in a third direction of movement perpendicular to the directions of movement of the cross rest and saddle. This has been accomplished heretofore by having a third slide enabling the tool to run perpendicular to the saddle and cross rest. Such an additional, third rest, however, signifies a relatively extensive and costly upgrading of the lathe, since such an additional rest has to bear the entire tool holding means, i.e., in the case of an NC lathe, the entire tool turret. Normally a machine investment of this kind would probably not pay, from the economical point of view, if it were made just to avoid the disadvantages of the first solution described.

The invention is therefore addressed to the problem of making it possible, with a minimum of trouble, to achieve an adjustment of the end mill in the third direction, i.e., perpendicular to the first two directions of movement of the saddle and cross rest.

The solution of this problem resides in that the milling tool can also perform a movement which contains the components of a third direction which is perpendicular to the first and second directions, without having the entire power driven tool head accompany this movement.

For the intended applications, no more than a slight adjustability of the end mill in the third direction of movement is sufficient. This has the advantage that the corresponding machine embodiments require but little space and therefore will complicate or interfere but slightly if at all with the machining of the workpiece. Furthermore, for the above-stated applications, continuous adjustability of the end mill in the third direction of movement is unnecessary, and instead it is sufficient for the end mill to be adjustable at the two end positions of this direction of movement and, if desired, in a central position between these two end positions. These two or these three possibilities of positioning can be realized by means of lock-ups at mechanically set positions with substantially less difficulty than any continuous adjustability such as can be realized, for example, by means of a screw drive. For the sake of maximum simplicity in the physical embodiment of such a slight adjustment of the tool in the third direction of movement, two different forms of embodiment are possible: The one possibility is for the power-driven radial and axial tool holder to be in two parts. The part bearing the tool can be swiveled by a small angular amount with respect to the other part of the power-driven tool holder, which is fixedly joined, for example, to the tool turret. The axis about which the movable part of the tool holder swivels in this case is parallel to one of the two directions of movement of the tool rests, depending on whether axial or radial slots are to be made. By this swiveling movement the tool executes an arcuate movement which also contains components of movement of the third direction of movement which is perpendicular to the directions of movement of the saddle and cross rest. The two end positions of these swiveling movements are established by adjustable stops which can also be situated outside of the tool holder and can be moved and adjusted mechanically, hydraulically or by any other method. The same applies to an adjustable central position, if any, in the pivoting movement. The driving of the tool mounted in the movable part of the tool holder is performed by gears, one of which, to compensate for the pivoting movement, is disposed coaxially with the swiveling axis of the movable part of the tool holder.

The other possibility consists in fastening the tool in an eccentric tool holder and, by turning the eccentric, to achieve a movement of the tool which again contains movement components in the third direction of movement perpendicular to the directions of movement of the saddle and cross rest. Here, again, depending on the magnitude of the eccentricity of the tool holder, only a slight turning of the eccentric is necessary in order to achieve the intended displacement of the end mill in the third direction of movement. The turning of the eccentric is performed by the tangential shifting of a stud which extends into a groove on the circumference of the eccentric. The stud is in turn fixedly joined to a slide which contains a slot whose longitudinal axis is perpendicular to the direction of displacement of the stud and parallel to the axis of rotation of the eccentric. Into this slot extends an axially disposed pin situated off-center on the face of a disk, so that a 180 degree rotation of the disk will cause the pin to run through the elongated hole from one end to the other end and back again, with simultaneous longitudinal movement of the slide and hence of the stud by twice the eccentricity of the pin with respect to the center of the disk. Inasmuch as between the two end positions of the pin there is a pin rotation of precisely 180 degrees, the entire system is self-locking at least at its end points, e.g., even over the entire pivoting range if the slide is appropriately adapted. The disk bearing the pin can be fastened in the hollow socket in which the entire tool holder is fastened, for example, in the tool turret, so that an automatic shifting of the eccentric and with it of the tool by the tool turret is possible by a turn of the disk.

Figure 2:
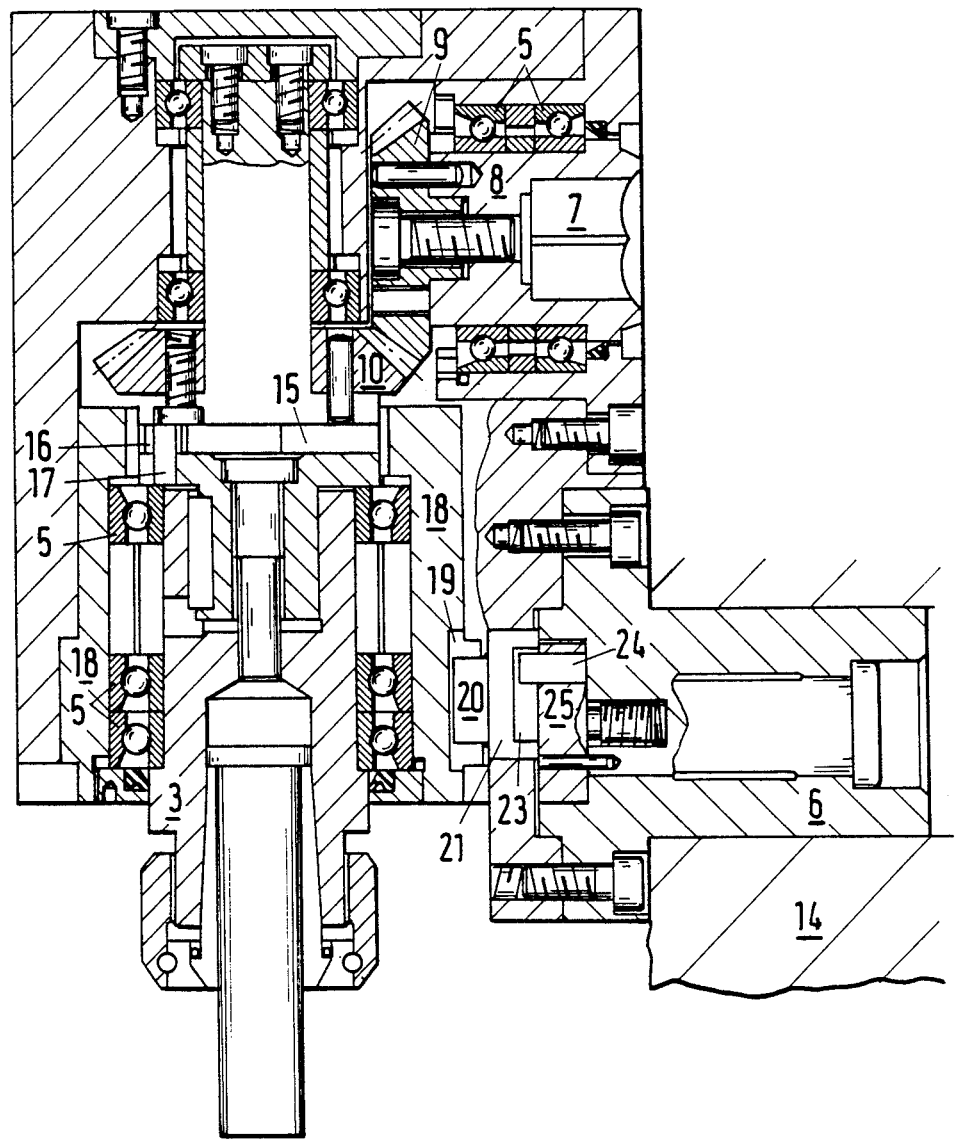
Figure 5:
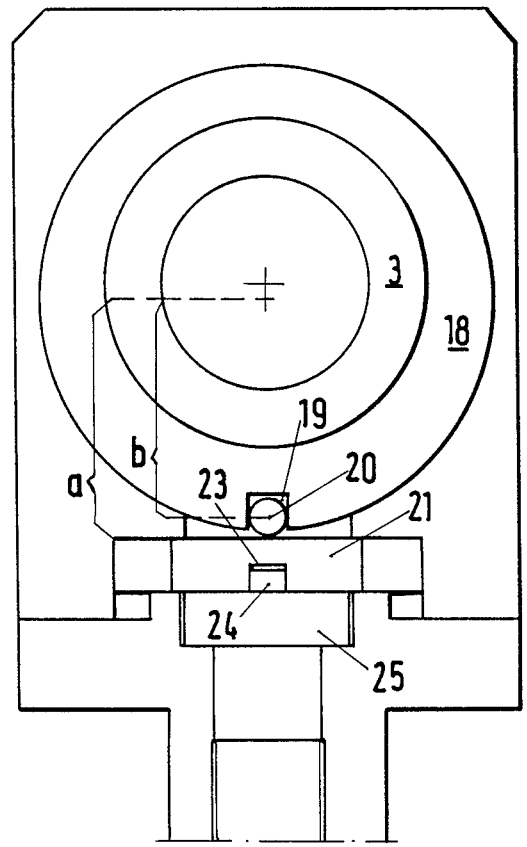

These two exemplifying embodiments are to be further described hereinbelow with the aid of the drawings, wherein:

FIG. 1 is a cross section through the embodiment of the partially rotatable tool holder, FIG. 2 a cross section of the embodiment of the tool holder with an eccentric tool chuck, FIG. 3 a detail of a cross section taken through the tool holder along the line E-F of FIG. 2, FIG. 4 a cross section through the tool holder taken along the line C-D of FIG. 2, FIG. 5 a cross section through the tool holder taken along the line A-B of FIG. 2.

FIG. 1 shows a cross section through a power driven tool head of the first embodiment, in which a portion of the tool head or tool holder which contains the tool 26 is slightly rotatable about the rest of the tool holder, namely about the pivot pin 1, which is fixedly joined to the tool turret 14, for example. In the movable part 2 of the tool holder there is the tool chuck 3 which is supported by the bearing 5 in part 2 of the tool holder. The stationary part 4 of the tool holder is fixedly joined to a tool turret, for example, by the shaft 6 which is situated in the corresponding socket of the tool turret. The tool chuck 3 is driven, and with it the indicated tool 26, by the driving device—in this case the square socket 7 in sleeve 8—which is situated, in that case, outside of the tool turret circumference. On the driven sleeve 8, which is supported by bearings 5 in the fixed part 4 of the tool holder, there is fastened a bevel gear 9 which drives a second bevel gear 10 which is disposed coaxially with the axis of the pivot pin 1 and in this manner compensates the swiveling movements of the movable part 2 of the tool holder. On the same shaft as the bevel gear 10 there is then another spur gear 11 which in turn meshes with a spur gear 12 which is joined to the tool chuck 3 for co-rotation therewith. The bevel gear 10 and the spur gear 11 are, of course, also supported by bearings 5 in the fixed part 4 of the tool holder.

The swiveling movement of the movable part 2 of the tool holder is furthermore limited by adjustable stops, which are not shown since they are outside of the tool holder. The swiveling movement of the movable part 2 of the tool holder until it contacts one of these two stops or is locked up in a middle position can then be provided by electrical, hydraulic, or other means, which, for example, can be controlled automatically by the machine control. The stops limiting the swiveling movement are shifted according to the wear of the milling cutter, so that the width of the groove being made will always remain within the desired tolerance despite the varying diameter of the cutter.

FIG. 2, on the other hand, shows a cross section through the embodiment of a tool holder in which the tool chuck 3 is of an eccentric configuration. The advantage of this embodiment consists in its compactness, since the rocking mechanism needed between the movable part 2 and the fixed part 4 of the tool holder is eliminated. In this embodiment too the tool head with the shaft 6 is fastened in a corresponding socket of the tool turret 14. The tool head drive is delivered through the square socket 7 in the sleeve 8 to which in turn a bevel gear 9 is fastened, which drives another bevel gear 10 which is disposed approximately coaxially with the tool chuck 3. Since, however, the chuck 3 is eccentrically mounted and rotatable to produce the movement of the tool in the desired direction, the result is a varying axial offset between the axis of rotation of the bevel gear 10 and the axis of rotation of the tool chuck 3, which offset is compensated by a cardan joint which is realized by the rocking disk 15 which is engaged by two driving studs 17 provided with bushings 16 extending from the bevel gear 10 and from the chuck 3. Both the bevel gears 9 and 10 and the tool chuck 3 are supported by bearings 5 in the casing of the tool head.

As represented in FIG. 5, the tool chuck 3 is situated off-center in the eccentric 18. This eccentric 18 has on its outer circumference a groove 19 extending parallel to its axis of rotation and having an approximately rectangular cross section. A cylindrical stud 20 which is affixed to the slide 21 also represented in FIG. 3 extends into this groove 19. If this slide 21 is shifted linearly by a slight amount tangentially to the circumference of the eccentric 18, so that the stud 20 is still unable to slip out of the groove 19, this will produce a rotation of the eccentric 18 by a limited angular amount, and with it an arcuate movement of the chuck 3 and hence of the tool, which also contains directional components of the third direction of movement that is perpendicular to the first and second directional components of the longitudinal and cross rest. The extent of the displaceability of the slide 21 is variable to a slight degree by the abutment pins 22, as required by the outside diameter or wear of the end mill 26 with respect to the desired width of the groove that is to be milled. The longitudinal displacement of the slide 21 is brought about by the fact that a pin 24 extends into a slot 23 running perpendicular to the direction of movement of the slide 21 and parallel to the axis of rotation of the eccentric 18 and protrudes axially off-center from the face of the disk 25 which is situated in the hollow interior of the mounting shank 6. Upon a rotation of the disk 25, the pin 24 consequently travels from one end to the other of the slot and back again, while the slide 21 covers a path of movement amounting to twice the eccentricity of the pin 24 in the disk 25, if the length of the slot 23 is made sufficient. In this manner a rotational movement of the eccentric 18 will result, resulting in a shift of the tool holder 3 and thus of the tool in the third direction of movement, which results from the amount of movement of the slide 21 in consideration of the transmission ratio (distance of slide 21 from the center of the eccentric 18 to the distance of the point of engagement of the stud 20 in the groove 19 from the center of the eccentric 18, shown as a/b in FIG. 5). If twice the eccentricity of pin 24 in disk 25 is not substantially more than the desired movement of the slide 21, the end positions of the slide 21 will correspond to angular positions of the pin 24, which are approximately diametrically opposite with reference to the center of the disk 25. On this account the slide 21 is self-locking in its end positions, since a force attacking in the direction of movement of the slide 21 can produce no rotation of the disk 25, since in this position of the slide 21 the necessary movement of the pin 24 is precisely perpendicular to the direction of movement of the slide 21, as is apparent from the path of the pin 24 indicated in FIG. 3. Since the disk 25 is inside of the shaft 6 of the tool head, the rotation of the eccentric 18 can in this manner be produced also from within the tool turret, which permits an automatic shift of the tool in the third direction of movement.

We claim:

1. A power driven milling tool comprising a tool socket in a power driven tool head having a pivot pin, for a machine tool having a longitudinal rest and a cross rest, said tool being movable in a first and a second direction perpendicular to one another, said directions being directions of movement of the longitudinal and cross rests of the machine tool, and means for enabling the milling tool perform another movement which contains components of a third direction perpendicular to the first and second directions, without having the power driven tool head in its entirety accompany the other movement, said means including means for limiting movement of the milling tool in the third direction and also means for adjusting only a middle position and end positions of the third direction of movement of the milling tool including adjustable stop pins for adjusting the end positions in the third direction, the tool socket being oscillatable with part of the tool head, the pivot pin having an axis of oscillation which is parallel to the first or second direction.

2. A milling tool according to claim 1, wherein the tool socket is oscillatable by hydraulic, pneumatic or electrical actuating elements outside of the tool head.

3. A power driven milling tool comprising a tool socket in an eccentric in a power driven tool head having a pivot pin, for a machine tool having a longitudinal rest and a cross rest, said tool being movable in a first and second direction perpendicular to one another, said directions being directions of movement of the longitudinal and cross rests of the machine tool, and means for enabling the milling tool to perform another movement which contains components of a third direction perpendicular to the first and second directions, without having the power driven tool head in its entirety accompany the other movement, said means including means for limiting movement of the milling tool in the third direction and also means for adjusting only a middle position and end positions of the third direction of movement of the milling tool including adjustable stop pins for adjusting the end positions in the third direction, movement of the milling tool in the third direction being performed by a rotation of the eccentric, and rotation of the eccentric being performed by a tangential displacement of a stud extending into the circumference of the eccentric.

4. A milling tool according to claim 3, wherein the stud is mounted on a slide, and displacement of the slide is performed by a rotation of a disk which is situated inside a shaft and from which a pin projects and extends into a slot in the slide.

5. A milling tool according to claim 4, wherein positions of the pin which correspond to end positions of the slide are approximately diametrically opposite with respect to the axis of rotation of the disk.

6. A milling tool according to claim 4 or 5, wherein the slide is self-locking over its range of adjustment.

7. A milling tool according to claim 4 or 5, wherein the disk is self-locking over its range of adjustment.

8. A milling tool according to claim 4 or 5, wherein the slide and the disk are self-locking over their range of adjustment.

* * * * *